J. R. CARROLL.
FREEZER.
APPLICATION FILED JUNE 1, 1909. RENEWED NOV. 22, 1911.
1,015,002.
Patented Jan. 16, 1912.
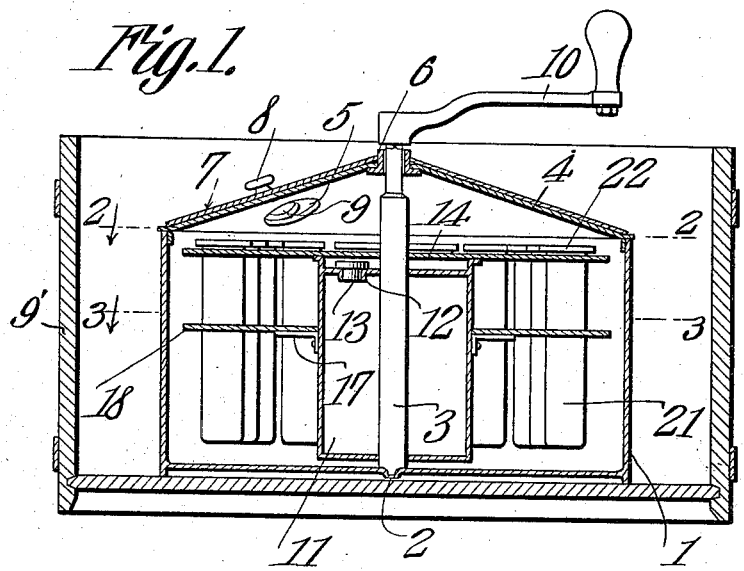
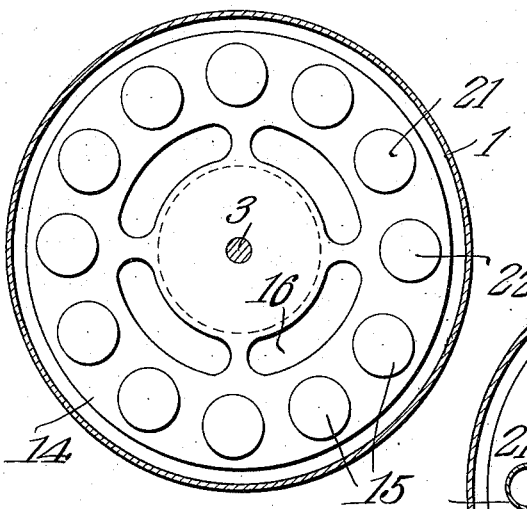
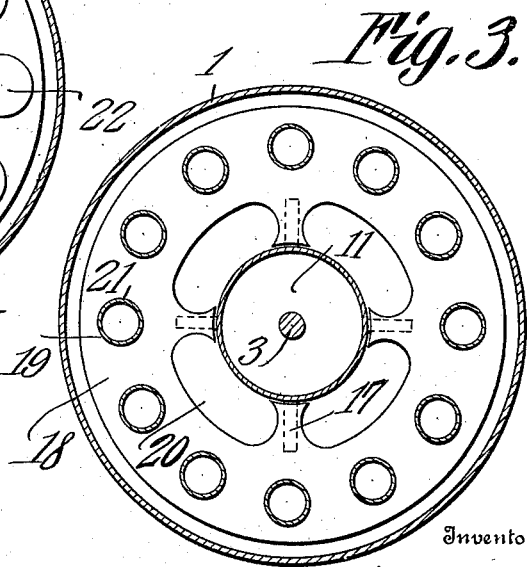
Witnesses
Inventor
James R. Carroll.

UNITED STATES PATENT OFFICE.

JAMES R. CARROLL, OF BOLLINGER, TEXAS.

FREEZER.

1,015,002.   Specification of Letters Patent.   Patented Jan. 16, 1912.

Application filed June 1, 1909, Serial No. 499,330. Renewed November 22, 1911. Serial No. 661,850.

*To all whom it may concern:*

Be it known that I, JAMES R. CARROLL, a citizen of the United States, residing at Bollinger, in the county of Runnels and State of Texas, have invented a new and useful Freezer, of which the following is a specification.

This invention has relation to freezers designed to be used for freezing cream and so forth and it consists in the novel construction and arrangement of its parts hereinafter shown and described.

The object of the invention is to provide a simple and an effective freezer which may be conveniently transported from place to place and which may be used for simultaneously freezing the contents of a series of relatively small receptacles containing the material to be frozen, the parts of the freezer being so arranged that any one of the said series of receptacles may be withdrawn from the freezer when desired without disturbing the remaining receptacles and thus it is possible to freeze at one operation several different bodies of cream each containing a different flavor.

A further object of the invention is to arrange in a structure of the character indicated means whereby a minimum amount of the freezing element or material may be used for effectually producing the desired result and with this feature in view the freezer contains a centrally located receptacle which may accumulate frost and when a sufficient quantity of such frost is accumulated the said receptacle may be hermetically sealed whereby the frost and a chilled volume of air is confined therein and this in addition to the freezing material above referred to will facilitate the freezing operation of the contents of the small receptacle. Means is provided for rotating the said central relatively large receptacle and supports are provided for the small receptacles whereby the small receptacles may rotate independently of each other and are caused to rotate by the swash created in the freezing agent by reason of the rotation of the said central receptacle.

In the accompanying drawings: Figure 1 is a vertical sectional view of the freezer. Fig. 2 is a horizontal sectional view of the device taken on the line 2—2 of Fig. 1. Fig. 3 is a horizontal sectional view of the same cut on the line 3—3 of Fig. 1.

The freezer includes a can 1 which is provided in the center of its bottom with a depression 2, and said depression serves as bearing for a vertically disposed shaft 3. A detachable cover 4 is adapted to close the upper end of the can 1 and is provided with an opening 5. The cover 4 is provided at its center with a bearing 6 which receives the upper portion of the shaft 3. A hood 7 is journaled upon the exterior surface of the bearing 6 and is provided with an upstanding knob 8. The hood 7 is further provided with an opening 9 which may be brought into register with the opening 5 of the cover 4. The hood 7 fits snugly against the outer surface of the cover 4 and when the said hood is so turned that the opening 9 therein is out of registration with the opening 5 in the cover substantially an air tight union is effected between the inner surface of the said hood and the exterior surface of the said cover. In operation the can 1 is placed in a tub 9' as illustrated in Fig. 1.

A detachable crank handle 10 is mounted upon the upper end of the shaft 3. A receptacle 11 is fixed to the lower portion of the shaft 3 and is provided in its top with an opening 12 which is adapted to be closed by a stopper 13. A plate 14 slidably engages the upper portion of the shaft 3 and is adapted to rest upon the upper end of the receptacle 12. Said plate is provided in the vicinity of its edge with a series of openings 15 adapted to contain the small receptacles above referred to and hereinafter to be specifically described and at points within the said openings 15 the said plate 14 is provided with larger openings 16. The chamber 11 is provided upon its outer side with a series of outstanding lugs 17. A plate 18 rests upon the lugs 17 and is provided in the vicinity of its outer edge with a series of openings 19 which are adapted to register vertically with the openings 15 in the plate 14. The said plate 18 is further provided at its inner edge with a series of openings 20 which may register with the openings 16 provided in the said plate 14. Receptacles 21 are adapted to be inserted in the openings 15 of the plate 14 and the openings 19 of the plate 18, and each receptacle 21 is provided with a suitable stopper or closure 22.

In operation the parts are assembled substantially as shown in Fig. 1 and within the tub 9' and about the exterior of the can 1 is placed a suitable packing of brine and ice or of other material. The individual receptacles 21 are inserted in the openings 15 and 19 through the openings 5 and 9 in the cover and hood respectively. Prior to insertion each of the said receptacles is filled with the material to be frozen. The said receptacles 21 rest loosely in the openings 15 and 19 and consequently are free to rotate therein. Salt and ice are then poured into the can 1 through the registering openings 9 and 5 in the hood and cover respectively and the said mixture passes down and comes in contact with the sides of the receptacles 21. The said mixture is free to pass around the edges of the plates 14 and 18 and may also pass down through the openings 16 and 20 in the said plates and lodge against the sides of the said receptacles 21. Prior to assembling the parts as last above described, the cork 13 is removed from the opening 12 in the receptacle 11 and when the parts have been assembled as indicated the hood 7 is turned so that its opening 9 passes the opening 5 in the cover 4. The said shaft 3 is then rotated by means of one operating the crank handle 10 and the chamber 11 is carried around with the said shaft. Inasmuch as the said chamber 11 in the initial instance contains nothing but air and is in contact with the salt and ice contained within the can 1 condensation will occur in the said chamber 11 and frost will form upon the inner side thereof which frost will eventually chill the air contained within the said receptacle. At the same time by reason of the rotation of the receptacle 11 a swash is created in the material contained within the can 1 and surrounding the receptacles 21 and this current will have a tendency to rotate individually the receptacles 21 and consequently the contents thereof will be evenly or smoothly frozen. After the operation as above described has been continued to such an extent as to accumulate a maximum amount of frost in the chamber 11 the hood 4 is removed and the plate 14 is lifted and the stopper 13 is inserted in the opening 12 of the chamber 11. Thus a volume of chilled air surrounded by a coating of frost is hermetically sealed within the chamber 11 and this air will serve as an auxiliary freezing agent and advance the process of congealing the contents of the said receptacles 21. It is of course understood that after the chilled air is confined in the receptacle 11 that the parts are reassembled substantially as shown in Fig. 1 and the rotation of the receptacle 11 through the instrumentality of the shaft 3 and crank handle 10 is continued. After the contents of the said receptacles 21 have been congealed the rotation of the shaft 3 and the chamber 11 may be stopped and the contents of the said receptacles will remain in a congealed state until they are removed from the freezer. When it is desired to remove one or more of the said receptacles the hood 7 is turned upon the cover 4 and the opening 9 therein is brought into register with the opening 5 when the fingers may be inserted through the said registering openings and one or more of the said receptacles 21 may be removed from the freezer without disturbing the remaining receptacles.

Having described my invention what I claim as new and desire to secure by Letters Patent is:—

A freezer comprising a can, a detachable cover for the can having an opening, a hood journaled upon the cover and having an opening adapted to register with the opening in the cover, a shaft journaled in the cover and the bottom of the can, a relatively large receptacle concentrically fixed to the shaft and spaced from the cover and bottom of the can and having an opening, a detachable closure for said opening, plates concentrically arranged within the can and having vertically registering openings, a series of relatively small receptacles loosely supported in the registering openings of said plates, and spaced from the cover and sides and bottom of the can and the sides of the large receptacle.

In testimony that I claim the foregoing as my own, I have hereto affixed my signature in the presence of two witnesses.

JAMES R. CARROLL.

Witnesses:
A. J. THORP,
W. R. BOGLE.